United States Patent [19]

Huang

[11] Patent Number: 5,035,161

[45] Date of Patent: Jul. 30, 1991

[54] WRENCH

[76] Inventor: Dora H. Huang, No. 14-1, Ln. 53, Chung Chen St., Shin Chuang, Taiwan

[21] Appl. No.: 564,449

[22] Filed: Aug. 8, 1990

[51] Int. Cl.$^5$ .............................................. B25B 13/00
[52] U.S. Cl. ...................................... 81/54; 81/57.14; 81/63
[58] Field of Search ................. 81/54, 57.14, 63, 33, 81/14, 61, 62; 173/163, 104, 117

[56] References Cited

U.S. PATENT DOCUMENTS 2,728,365 12/1955 Austin ..................................... 81/54
4,920,831 5/1990 Huang ..................................... 81/54

Primary Examiner—Maurina Rachuba
Attorney, Agent, or Firm—Dvorak and Traub

[57] ABSTRACT

A wrench comprising a housing inside which a switch, a reversible motor and a torque transmitting mechanism are disposed. The reversible motor is controlled by the switch and serves as torque source with the power supplied by an external electric power source, such as an automobile electric system. The torqure transmitting mechanism comprises basically a drive shaft mechanically connecting to the motor spindle and a follower shaft which is coupled to the drive shaft by means of a drive member in the form of a pair of wings connected together and a transmission member which controls the engagement of the drive shaft with the follower shaft. The transmission member is in turn controlled by an arrestor which makes the transmission member to have the drive member engage with the follower member when the rotational speed thereof reaches a pre-specified value. A plurality of spring-biased balls are provided and disposed in the wings of the drive member to prohibit any un-wanted contact of the wings with the follower shaft when they are supposed to be disengaged from each other and to provide a smooth engagement therebetween when the arrestor reaches the pre-specified rotational speed and have the drive member get to engage the follower shaft.

1 Claim, 4 Drawing Sheets

WRENCH

This application covers an improvement over the applicant's own invention disclosed in U.S. Pat. No. 4,920,831.

BACKGROUND OF THE INVENTION

Conventionally, disassembling a wheel from the axle thereof is done either by human power or pneumatic power. A pneumatic device generally requires a power source which is not easy to carry in a passenger car. Using hand tools to disassemble, although convenient to be carried, is difficult and takes great effort. To overcome the difficult, U.S. Pat. No. 4,727,780 disclosed by the inventor of the present inventor provides a handy electrical wrench which generates impact torque and applies this torque to an over-tight stud screw of a wheel so as to loose the screw which in general may not be easy to loose by human power only. The wrench is small in size and compact in design and thus is as easy to carry as a hand tool.

The inventor of the present invention further disclosed an improvement over the above-mentioned patent, which is a continuation-in-part of the above-mentioned patent and has been assigned the U.S. Pat. No. 4,920,831. In the U.S. Pat. No. 4,920,831, and arrestor is added to the electrical wrench. The arrestor provides an automatic engagement/disengagement of power trassmision to the stud screw while the work is done manually in the U.S. Pat. No. 4,727,780.

The devices disclosed in these patents, however, have a disadvantage. That is, when torque is to be transmitted to the stud screws, a moving part thereof has to engage with other parts so as to establish the transmission; and this is not done very smoothly in the devices of the previous patents. Since the transmitted torque is great, the un-smooth engagement usually results in a damage to the device after a long while operation.

It is therefore an object of the invention to improve the devices and to obviate the drawback.

SUMMARY OF THE INVENTION

It is an object of the invention to provide a wrench of which the drive part and the follower part can be coupled to each other smoothly and thus no damange incurs due to an un-smooth contact therebetween.

To achieve the above-mentioned object, there is provided an electrical wrench comprising a housing inside which a switch, a reversible motor and a torque transmitting mechanism are disposed. The reversible motor controlled by the switch and served as a torque transmitting mechanism are disposed. The reversible motor is controlled by the switch and serves as a torque source with the power supplied by an external electric power source, such as an asutomobile electric system. The torque transmitting mechanism basically comprises a drive shaft mechanically connecting to the motor spindle and a follower shaft which is coupled to the drive shaft by means of a drive member in the form of a pair of wings connected together and a transmission member controlling the engagement of the drive shaft with the follower shaft. The transmission member is in turn controlled by an arrestor which makes the transmission member to have the drive member engaged with the follower member when the rotationalo speed thereof reaches a pre-specified value.

A plurality of spring-biased balls are provided and disposed in the wings of the drive menber to prehibit un-wanted contact of the wings with the follower shaft when they are supposed to be disengaged from each other and to provide a smooth engagement therebetween when the arrestor reaches the pre-specified rotational speed and have the drive member get to engage the follower shaft.

The above and other aspects of the invention, as well as other benefits, will readily be ascertained from the following detailed description of the preferred embodiment of the invention, reference being had to be accompanying drawings, in which:

BRIEF DISCRIPTION OF THE DRAWINGS

DETAILED DESCRIPTION OF THE PREFERRED EMBODIMENT

Figure 1:
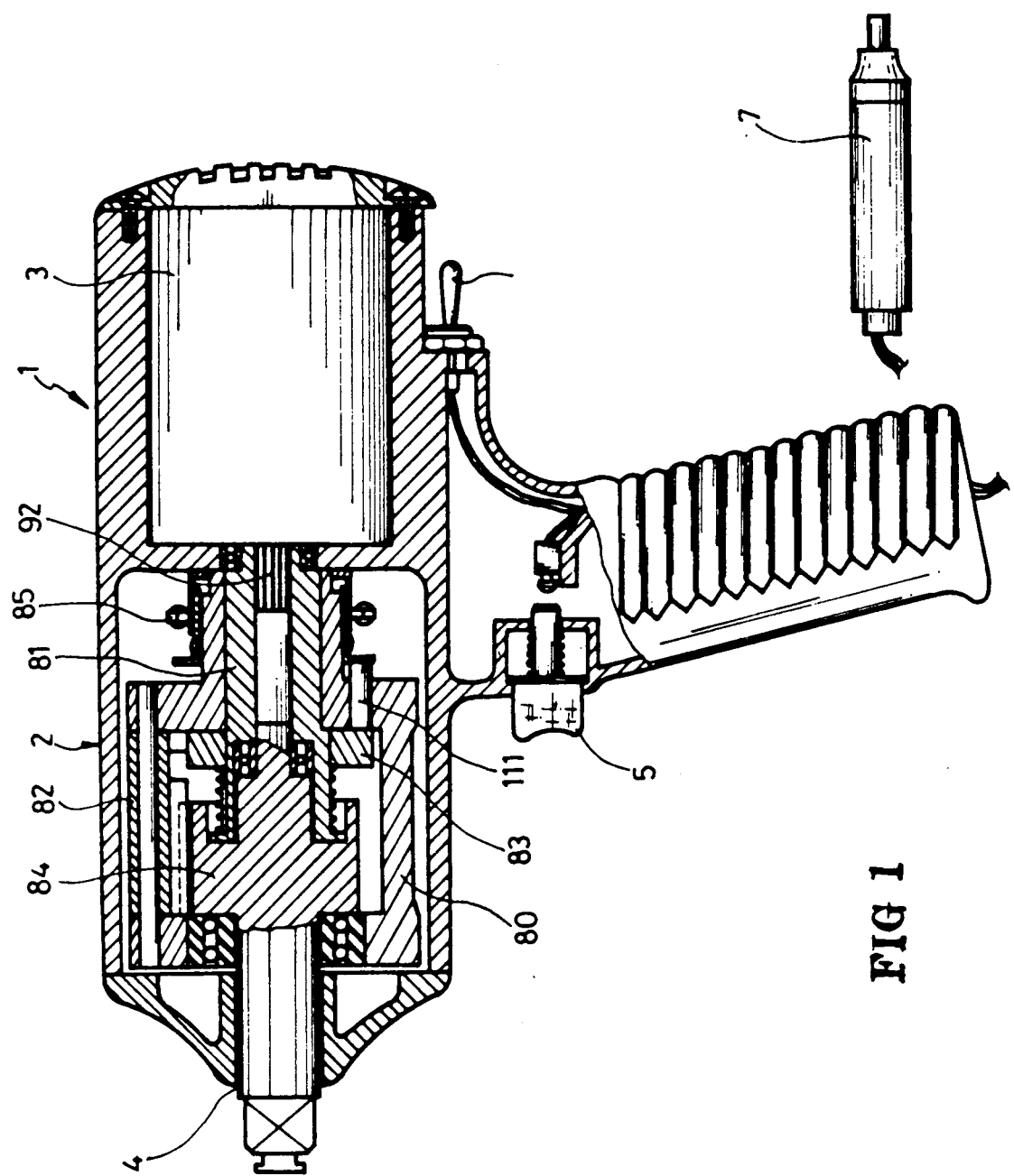
FIG. 1 is a partial cross-sectional view of the preferred embodiment of the invention.

With reference to the drawings and in particular to FIG. 1, a wrench in accordance with the invention, generally designated by reference numeral 1, comprises a housing 2, inside which a reversible motor 3 and a torque transmitting mechanism 4 are disposed. The reversible motor 3 is controlled by a switch 5 and the rotation direction of the motor 3 is determined by a steering control device 6, both being disposed and fixed on the housing 2. The power of the motor 3 can be obtained from a suitable external source not shown, such as an automobile electrical system and the power is transmitted to the motor 3 by means of a switchable plug 7. Since the connection of the motor 3 to an external power source is well known to those skilled in the art, no further description will be given herein.

Figure 2:
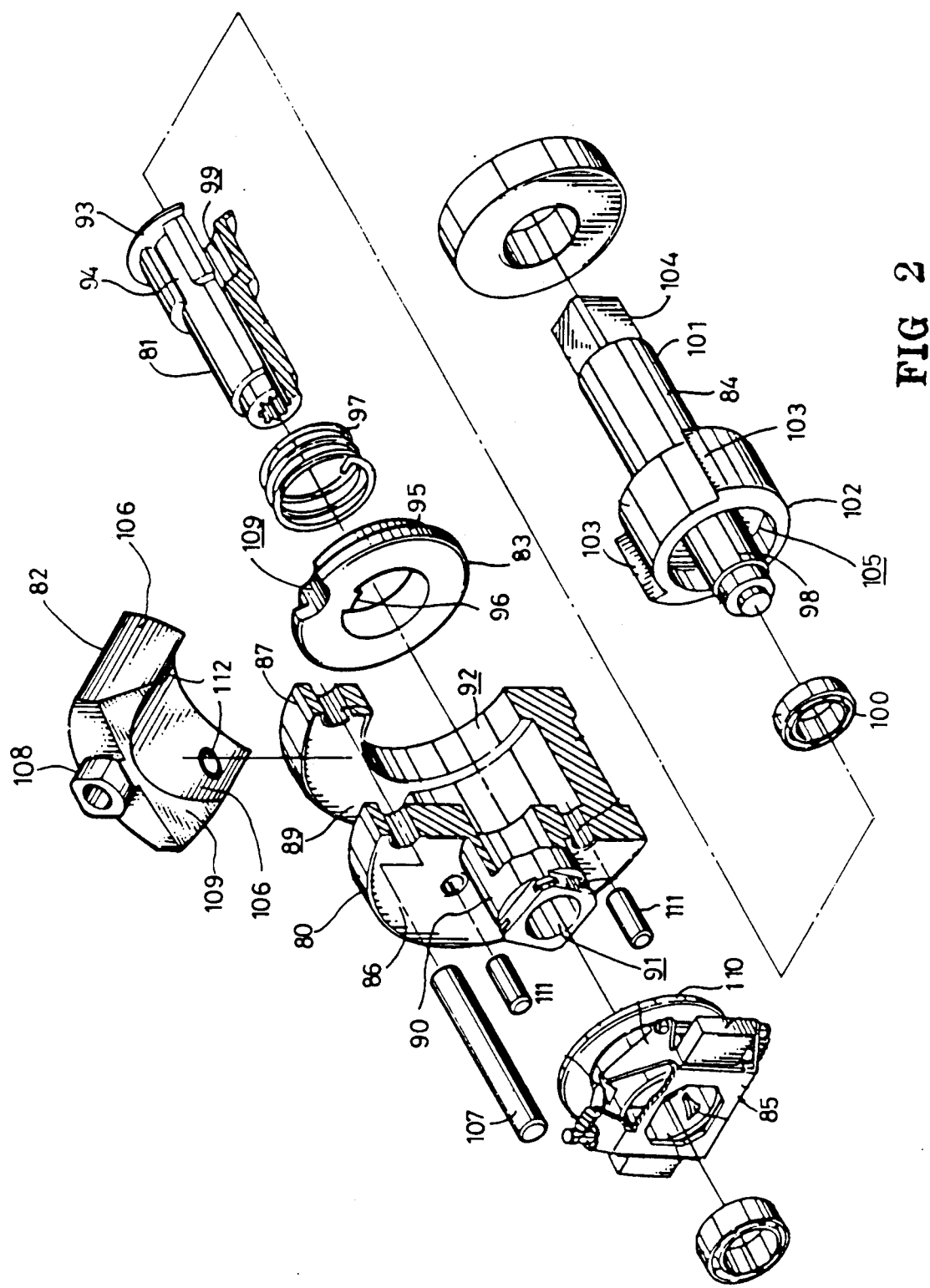
FIG. 2 is a fragmental view of a torque transmitting mechanism of the invention.

Referring to FIG. 2, the torque transmitting mechanism 4 comprises a main body 80, a drive shaft 81, a drive member 82, a trasmission member 83, a follower shaft 84 and an arrestor 85. The main body 80 is constituted by a first side wall 86 and a second side wall 87 connected together by a connecting piece 88 so as to form a hollow space 89 therebetween. The first side wall 86 has a tube 90 projecting outward therefrom and a first hole 91 running through both the first side wall 86 and the tube 90 with the diameter thereof large enough to receive a first end of the drive shaft 81 therein. A second hole 92 runs through the second side wall 87. The drive shaft 81 with the first end thereof inserted into the hole 91 to engage with the motor spirdle 92 (see FIG. 1), has a second end, with a right-angled flange 93 and a key slot 94 formed thereon, disposed in the hollow space 89. The transmission menber 83, in the form of a short hollow cylinder with a circumferential flange 95 formed therearound at one end thereof, has a key 96, corresponding to the key slot 94, formed on the inside surface thereof. The transmission member 83 is disposed in the hollow space 89 with the drive shaft 81 passing therethrough and the key 96 engaging the key slot 94. A spring 97 is disposed between the transmission member 83 and the right-angled flange 93 of the drive shaft 81 to push the transmission member 83 away from the right-angled flange 93 of the drive shaft 81.

The follower shaft 84 comprises a first section 98 which is insertable into a central hole 99 running along the axle of the drive shaft 81 with a bearing 100 disposed therebetween and a second section 101 connected together by an expanded tooth part 102 disposed therebetween. The tooth part 102 has a pair of spaced teeth 103 inclined toward each other. The second section 101 has a special shaped end 104, such as a squre one, to engage with a socket (not shown). An annular groove 105 is formed at the connection of the first section 98 and the tooth part 102 to receive the right-angled flange 93 of the drive shaft 81 therein when the first section 98 of the follower shaft 84 is inserted into the central hole 99 of the drive shaft 81. The dimensions of the tooth part 102 and the annular groove 105 are so selected that while the right-angled flange 93 of the drive shaft 81 is disposed inside the annular croove 105, the trasmission member 83 is not able to enter the annular groove 105 and abut against the perimeter of the groove 105. The tooth part 102 and the right-angled flange 93 of the drive shaft 81 and the transmission member 83 are disposed at the hollow space 89 of the main body 80 with the first section of the follower, shaft 84 passing through the transmission member 83, the first side wall 86 and the tube 90 of the main body 80.

Figure 3:
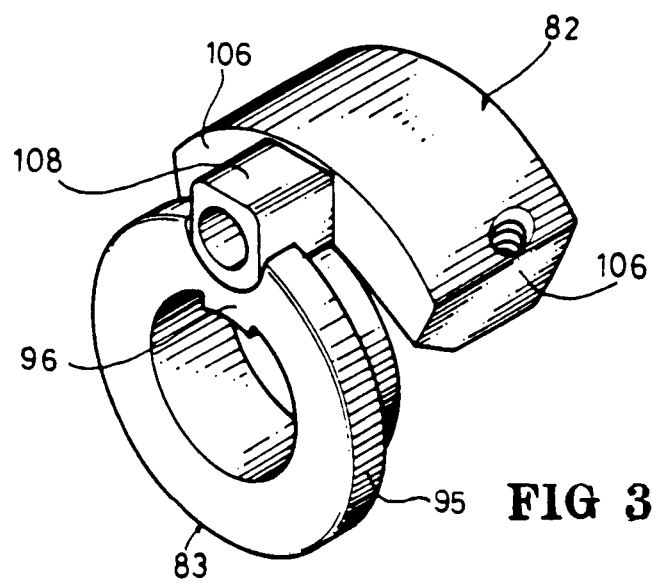
FIGS. 3 and 4 show the relative movement of a transmission member with respect to a drive member.
Figure 4:
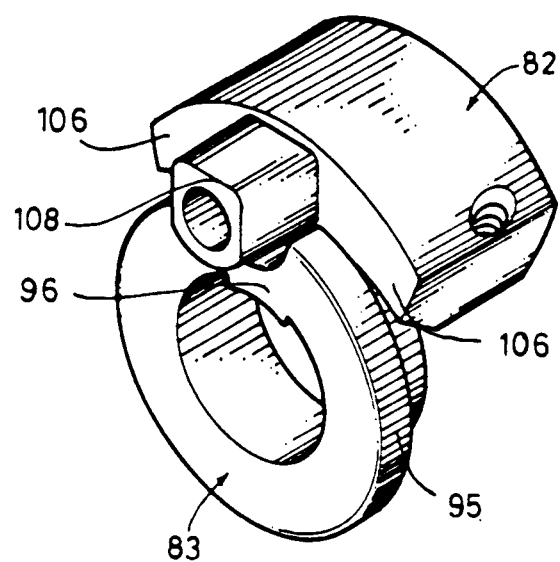

The drive member 82, in the form of a pair of wings 106 connected together, is rotatable about a fixed pin 107 which runs through the first side wall 86 of the main body 80, the drive member 82 and the second side wall 87 of the main body 80. The wings 106 are slightly slanted inwards and are so disposed with respect to the tooth part 102 of the follower shaft 84 that when the wings 106 rotate, one of them will get into contact with one of the teeth 103 and abutting thereon. The drive member 82 also has an extension part 108 through which the fixed pin 107 is also running. The extension part 108 is so shaped that it can be disposed on an arc slot 109 formed on the outside surface of the transmission member 83 and running therethrough. The drive member 82, except rotating about the fixed pin 107, is fixed in the main body 80, while the transmission member 83, although being biased by the spring 93, is moveable with respect to the drive member 82. When the transmission member 83 abuts against the perimeter of the annular groove 105 of the follower shaft 84, the relative position of the transmission member 83 with respect to the drive member 82 is shown in FIG. 3 and the rotation of the wings 106 of the drive member 82 is prohibited by the transmission member 83. When the transmission member 83 abuts against the first side wall 86 of the main body 80, the relative position of the transmission member 83 with respect to the drive member 82 is shown in FIG. 4 and, under this situation, the wings 106 of the drive member 82 are free to rotate about the fixed pin 107 and thus engaging with the teeth 103 of the tooth part 102 of the follower shaft 84. To assist the relative movement of the transmission member 83 with respect to the drive member 82, an inclined surface 109 is formed on the drive member 82.

To control the relative position of the transmission member 83 with respect to the drive member 82, a convex disk 110, together with the arrestor 85, is disposed on the tube 90 of the main body 80. The arrestor 85, which is securely fixed on the end of the tube 90, exerts a driving force on the convex disk 110 and, thus, driving the disk 110 toward the first side wall 86 of the main body 80 when the rotation speed of the main body 80 as well as the arrestor 85 reaches a certain value.

A plurality of moveable pins 111 disposed in the main body 80 and around the tube 90. The moveable pins 111, which are slidable in the main body 80, abuts against the convex disk 110 with one end thereof and against the transmission member 83 with the other end thereof when the rotation speed of the arrestor 85 reaches the above-mentioned certain value, the convex disk 110 moves toward the first side wall 86 of the main body 80 and thus pushing the transmission member 83, by means of the moveable pins 111 toward the annular groove 105 of the follower shaft 84. When the rotaion speed is lower than the specific value, spring 97 will pushes the transmission member 83 and the convex disk 110 toward the far end of the tube 90.

Figure 5:
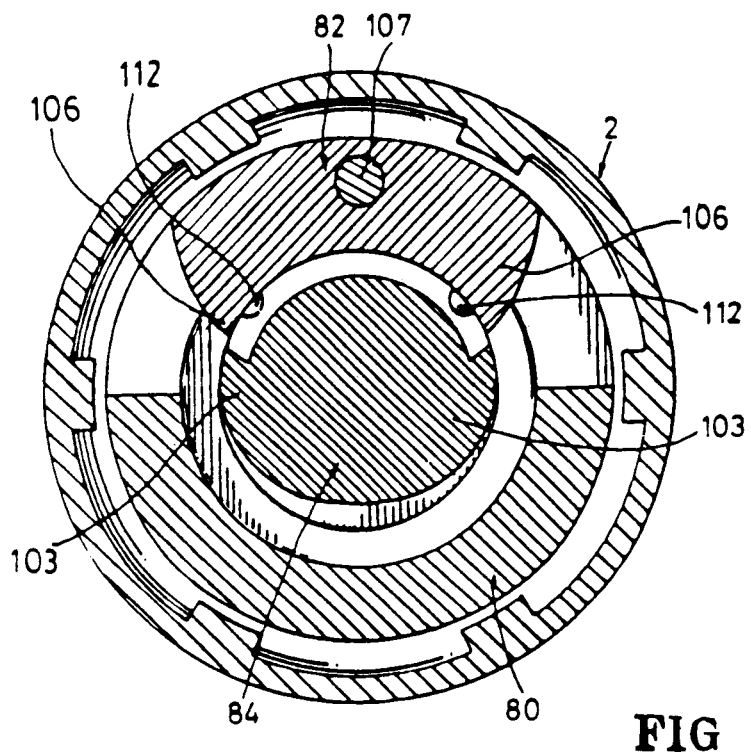
FIGS. 5 and 6 are cross-sectional views respectively showing the relative positions of a pair of wings of the drive member with respective a follower shaft before and after the wings engages with the follower shaft.
Figure 6:
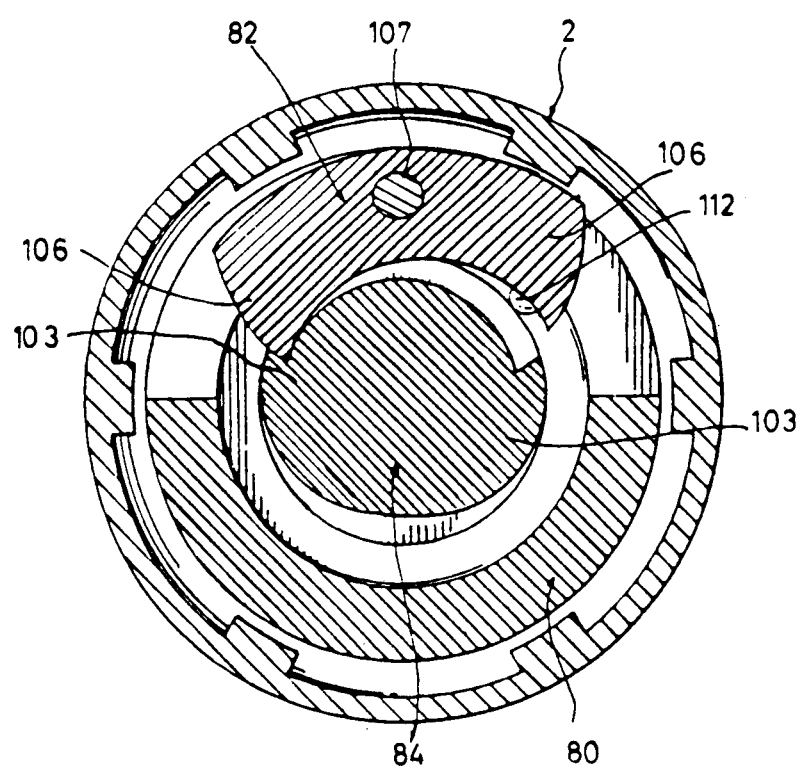

Referring now to FIG. 5 and 6, to avoid un-wanted contact between the tooth part 102 of the follower shaft 84 and the wings 106 of the drive member 82, a plurality of spring-biased balls 112, preferaboy made of abrasion- and wear-resistant material, are disposed on the underside of the wings 106. When the wings 106 are not prehibited to rotate about the fixed pin 107, the relative position of the drive member 82 with respect to the follower shaft 84 is shown in FIG. 5. Under this situation, when the main body 80 rotates, the teeth 103 do not contact the wings 106 themselves, but contacting the spring-biased balls 112. When the wings 106 are allowed to rotate about the fixed pin 107, the contact of one of the teeth 103 with one of the spring-biased ball 112 will rotate the drive member 82 about the fixed pin 107 and thus making the drive member 82 engage with the tooth part 102 of the follower shaft 84. This makes the follower shaft 84 rotate synchronously with the main body 80 about as axle running through the motor spindle 92 and transmits torque to the socket (not show) fixed on the shaped end 104 of the follower shaft 84.

It should now be apparent that although the invention has been described in connection with the preferred embodiment, it is contemplated that those skilled in the art may make changes to certain features of the preferred embodiment without altering the overall basic function and concept of the invention and without departing from the spirit and scope of the invention, as defined in the appended claims.

What is claimed:

1. A wrench comprising a housing inside which a reversible motor, serving as a torque source and controlled by switching means is disposed, said wrench further comprising, inside said housing, a torque transmitting mechanism which comprises:

a main body, having a first side wall and a second side wall which are connected together by a connecting piece to form a hollow space therebetween, a tube projecting outward from said first side wall, a first hole running through both said tube and said first side wall, a second hole running through said second side wall;

a drive shaft, having a first end passing through said first hole to engage with a spindle of said reversible motor, and a second end, with a right-angled flange and a key slot formed thereon, disposed inside said hollow space;

a transmission member in the form of a short hollow cylinder with a circumferential flange formed therearound at one end thereof and having a key, corresponding to said key slot, formed on the inside surface thereof, said transmission member being disposed in said hollow space with said drive shaft passing therethrough and said key engaging with said key slot, a spring being disposed between said transmission member and said right-angled flange of said drive shaft to push said transmission member away from said right-angled flange;

a follower shaft having a first section insertable into a central hole running along an axle of said drive shaft with a bearing disposed therebetween, a second section having a shaped end to engage with a socket, and an expanded tooth part connecting said first and second sections together and having a pair of spaced teeth inclined toward each other, and annular groove being formed at the connection of said first section and said tooth part ot receive said second end of said drive shaft therein with said first section inserted into said central hole and said tooth part disposed inside said hollow space;

a drive member, which is in the form of a pair of wings connected together and is rotatable about a fixed pin running through said first side wall, said drive member and said second side wall, said wings being slightly slanted inwards and being so disposed with respect to said tooth part of said follower shaft that when said wings rotate about said fixed pin, one of them engages with and abuts against one of said teeth, said drive member further having an extension part, through which said fixed pin also runs, said extension part being so shaped that it is disposed in an arc slot formed on the outside surface of said transmission member and rotatable therein, said drive member being so disposed with respect to said transmission member that when said transmission member is located at a first position, the rotation of said drive member with respect to said fixed pin is prohibited by said transmission member and when said transmission member is at a second position, said drive member is free to rotate about said fixed pin;

an arrestor disposed at an end of said tube and a convex disk disposed between said arrestor and said first side wall, said arrestor, when reaching a pre-specified rotational speed, moving said convex disk toward said first side wall of said main body and then pushes said transmission member toward said annular groove of said follower shaft with the help of a plurality of moveable pins which are spaced around said first hole of said main body with one end thereof abutting said convex disk and the other end thereof abutting said transmission member and are slidable with respect to said main body; and a plurality of spring-biased balls, made of abrasion- and wear-resistant material, disposed on the under side of said wings of said drive member, said balls being so located that when said transmission member is at said first position, said teeth of said tooth part of said follower contact only said balls and when said transmission member is at said second position, said teeth contact said balls and pushing one of said wings inwards to engage with one of said teeth.

* * * * *